US011198169B2

(12) United States Patent
Na et al.

(10) Patent No.: US 11,198,169 B2
(45) Date of Patent: Dec. 14, 2021

(54) BLOW MOLDING DEVICE CAPABLE OF CONTINUOUS PROCESSING

(71) Applicant: Korea Institute of Machinery & Materials, Daejeon (KR)

(72) Inventors: Young Sang Na, Changwon-si (KR); Ka Ram Lim, Changwon-si (KR); Jong Woo Won, Changwon-si (KR)

(73) Assignee: KOREA INSTITUTE OF MATERIALS SCIENCE, Gyeongsangnam-Do (KR)

( * ) Notice: Subject to any disclaimer, the term of this patent is extended or adjusted under 35 U.S.C. 154(b) by 130 days.

(21) Appl. No.: 16/606,041

(22) PCT Filed: Mar. 22, 2018

(86) PCT No.: PCT/KR2018/003290
§ 371 (c)(1),
(2) Date: Oct. 17, 2019

(87) PCT Pub. No.: WO2018/199476
PCT Pub. Date: Nov. 1, 2018

(65) Prior Publication Data
US 2020/0130040 A1 Apr. 30, 2020

(30) Foreign Application Priority Data
Apr. 26, 2017 (KR) .................. 10-2017-0053604

(51) Int. Cl.
*B21D 37/16* (2006.01)
*B21D 26/029* (2011.01)
*B21D 26/031* (2011.01)

(52) U.S. Cl.
CPC ......... *B21D 26/029* (2013.01); *B21D 26/031* (2013.01); *B21D 37/16* (2013.01)

(58) Field of Classification Search
CPC .. B21D 26/025; B21D 26/027; B21D 26/029; B21D 26/031; B21D 26/041;
(Continued)

(56) References Cited

U.S. PATENT DOCUMENTS 2,728,317 A * 12/1955 Clevenger ............ B21D 26/027
72/60
4,474,044 A * 10/1984 Leistner ............... B21D 26/055
72/19.1
(Continued)

FOREIGN PATENT DOCUMENTS

JP   H11138220 A    5/1999
JP   2006-159258 A  6/2006
(Continued)

OTHER PUBLICATIONS

International Search Report PCT/ISA/210 for International Application No. PCT/KR2018/003290 dated Jul. 9, 2018.

*Primary Examiner* — Edward T Tolan

(57) ABSTRACT

The present invention relates to a blow molding device including: a heating unit which is configured to heat a molding material; and molds between which the molding material is loaded and molded, in which the heating unit includes: an infrared lamp configured to emit infrared rays, a reflective mirror configured to concentrate the infrared rays emitted from the infrared lamp; and a light transmitting body configured to transmit the infrared rays concentrated by the reflective mirror to the molding material, and in which the molds mold the molding material by using gas pressures applied to surfaces of the molding material heated to a predetermined temperature by the infrared rays transmitted from the light transmitting body.

9 Claims, 5 Drawing Sheets

(58) Field of Classification Search
CPC ...... B21D 26/055; B21D 37/16; B29C 33/06; B29C 51/36; B29C 51/42; B29C 51/421
See application file for complete search history.

(56) References Cited

U.S. PATENT DOCUMENTS

| | | | | |
|---|---|---|---|---|
| 5,007,265 A | * | 4/1991 | Mahoney | B21D 26/055 |
| | | | | 72/37 |
| 5,324,368 A | * | 6/1994 | Masumoto | B21D 26/02 |
| | | | | 148/403 |
| 5,345,799 A | * | 9/1994 | Miodushevski | B21D 11/20 |
| | | | | 72/19.8 |
| 6,907,761 B2 | * | 6/2005 | Spence | B21D 26/055 |
| | | | | 29/421.1 |
| 8,916,087 B2 | * | 12/2014 | Schroers | C22C 1/02 |
| | | | | 264/535 |
| 9,057,120 B2 | * | 6/2015 | Pham | B22D 27/04 |
| 9,511,404 B1 | * | 12/2016 | Huang | B21D 45/02 |
| 10,562,090 B2 | * | 2/2020 | Nazaret | G05B 19/042 |
| 2003/0056562 A1 | * | 3/2003 | Kamano | B21J 1/006 |
| | | | | 72/342.7 |

FOREIGN PATENT DOCUMENTS

| | | |
|---|---|---|
| KR | 200197970 Y1 | 10/2000 |
| KR | 101500985 B1 | 3/2015 |
| KR | 101516801 B1 | 5/2015 |
| KR | 101621239 B1 | 5/2016 |

\* cited by examiner

[FIG. 1]
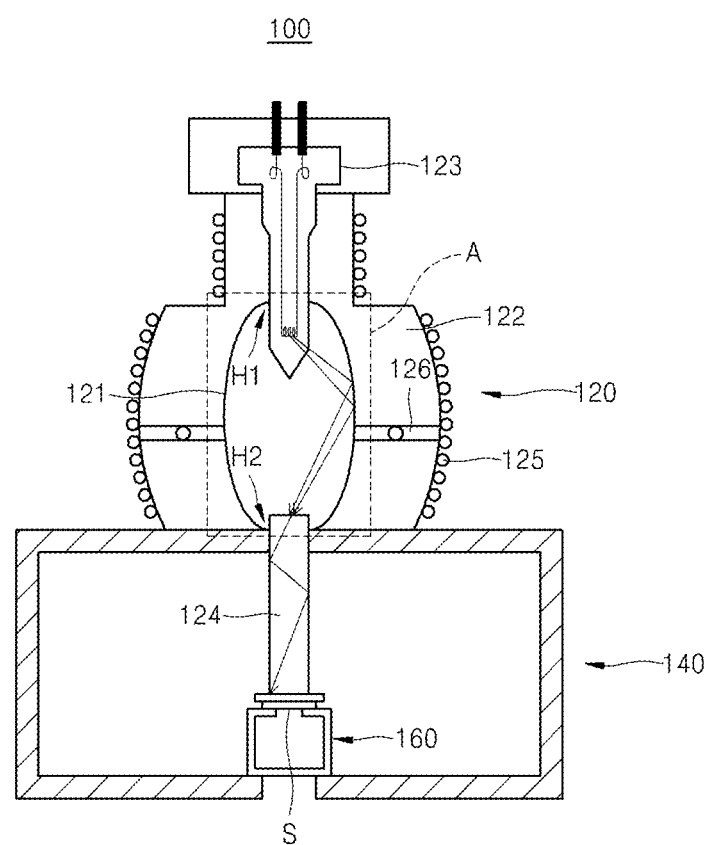

[FIG. 2]
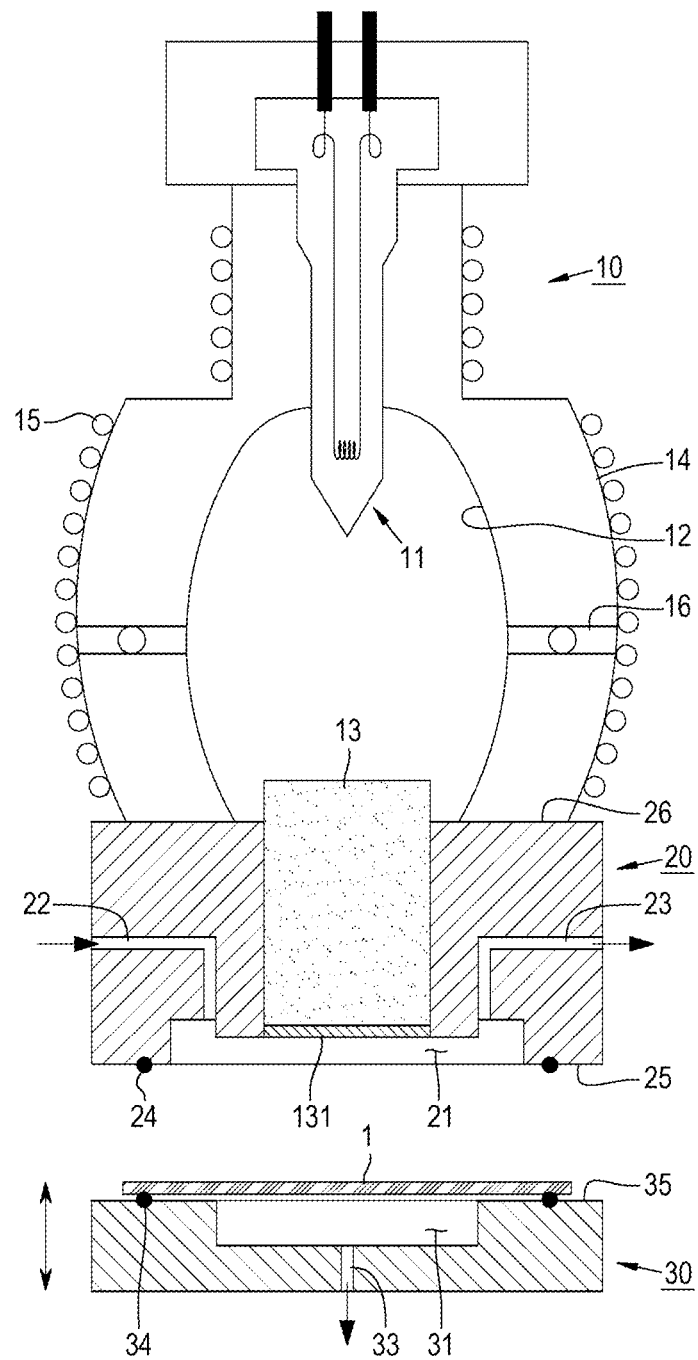

[FIG. 3]
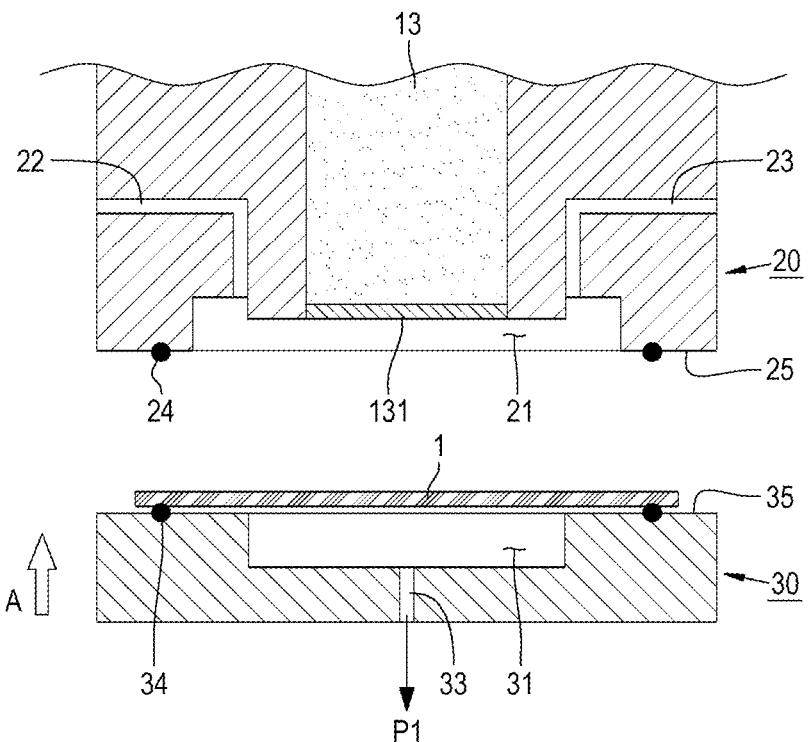
[FIG. 4]
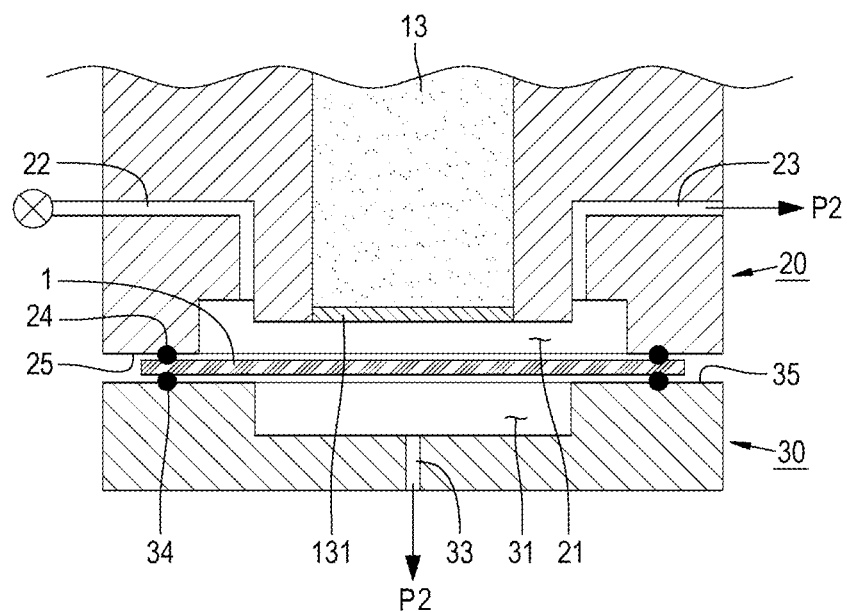

[FIG. 5]
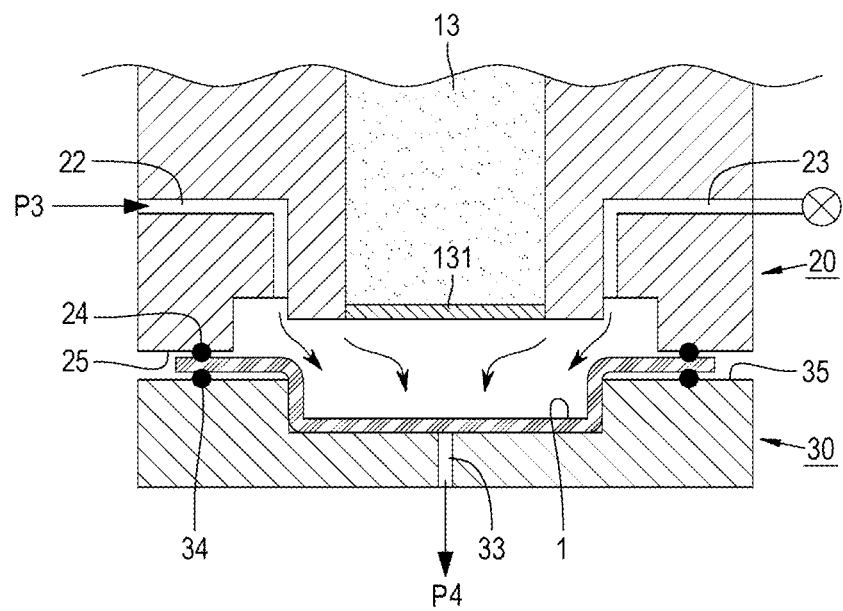
[FIG. 6]
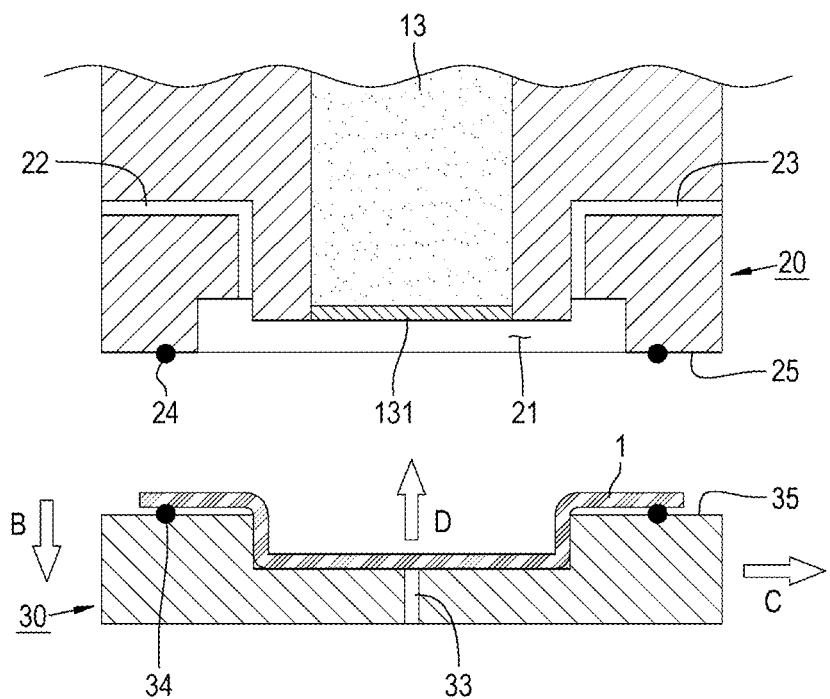

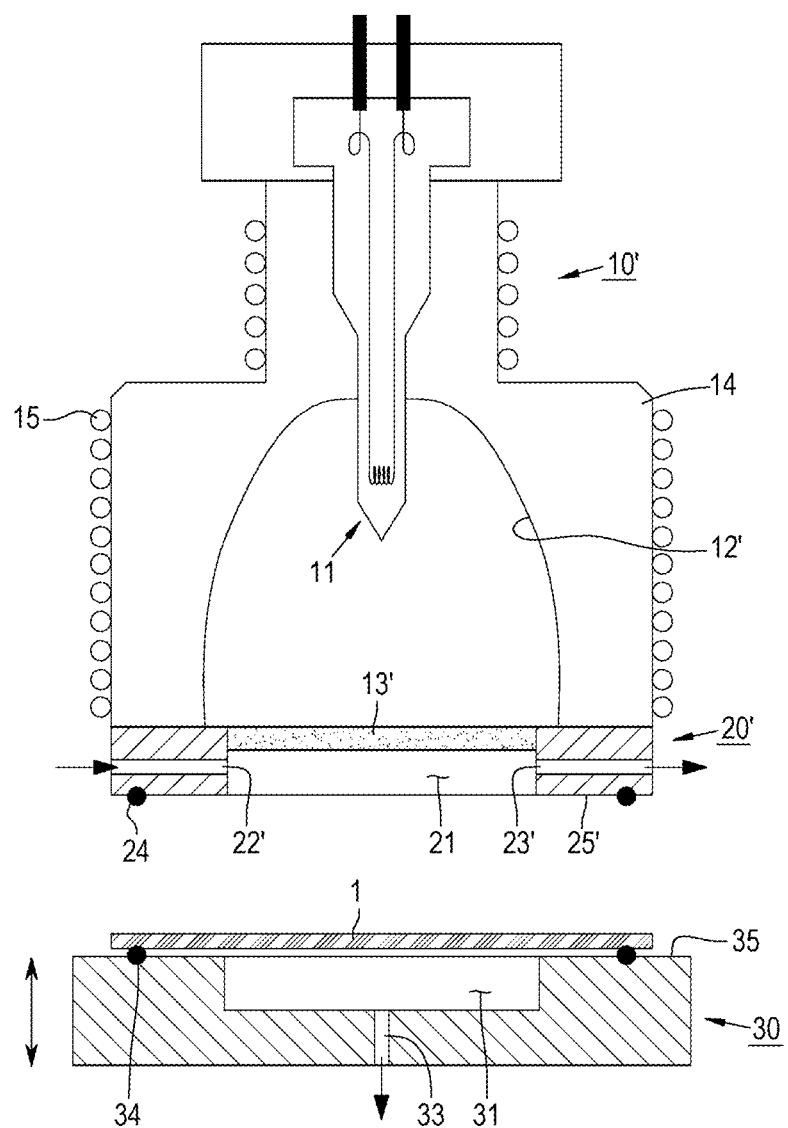
[FIG. 7]

BLOW MOLDING DEVICE CAPABLE OF CONTINUOUS PROCESSING

CROSS-REFERENCE TO RELATED APPLICATIONS

This application is a national phase under 35 U.S.C. § 371 of PCT International Application No. PCT/KR2018/003290 which has an International filing date of Mar. 22, 2018, which claims priority to Korean Application No. 1020170053604, filed Apr. 26, 2017, the entire contents of each of which are hereby incorporated by reference.

TECHNICAL FIELD

The present invention relates to a blow molding device, and particularly, to a molding device that molds a molding material into a shape corresponding to a shape of a mold by using a difference in pressure between two surfaces of the molding material.

BACKGROUND ART

An amorphous alloy has an inherent combination of high strength, high elasticity, high corrosion resistance, and excellent workability in a super cooled liquid state. The amorphous alloy is manufactured by a method of rapidly cooling an alloy from a temperature exceeding a crystal melting temperature to below an amorphous glass transition temperature to prevent crystal formation caused by formation and growth of nucleus.

A blow molding technique has been studied as a technique for forming the amorphous alloy into a specific shape suitable for a demand of the amorphous alloy. As products of researches and developments conducted by the applicants and the inventors related to the present application, there are inventions related to blow molding devices and disclosed in Korean Patent No. 1500985 (Document 1) and Korean Patent No. 1516801 (Document 2).

Documents 1 and 2 each disclose the blow molding device suitable for the blow molding of the amorphous alloy. Regarding the blow molding devices disclosed in Documents 1 and 2, a configuration and an operation of a blow molding device according to a first exemplary embodiment disclosed in Document 1 will be described with reference to FIG. 1 attached to Document 1.

A blow molding device 100 disclosed in Document 1 includes a heating unit 120, a support unit 140, and a molding unit 160. The heating unit 120 includes a reflective mirror 121, a molding body 122, an infrared lamp 123, a quartz rod 124, and a cooling line 125.

The reflective mirror 121 has an ellipse shape, and the infrared lamp 123, which emits infrared rays for heating a molding material S, is disposed at a center of the reflective mirror 121, such that the infrared rays emitted from the infrared lamp 123 are concentrated on an upper surface of the quartz rod 124 disposed below the reflective mirror 121.

The quartz rod 124 functions as a light transmitting body for transmitting infrared rays, and the infrared rays, which are concentrated on the upper end surface of the quartz rod 124 by the reflective mirror 121, enter the upper end of the quartz rod 124, reflect in the quartz rod 124, and then exit from a lower end of the quartz rod 124.

The support unit 140 is disposed below the heating unit 120, and the molding unit 160 is disposed in the support unit, such that the molding material S placed on the molding unit 160 is heated by the infrared rays which are introduced into the support unit 140 and transmitted by the quartz rod 124.

The blow molding is performed by rapidly raising, by using the heating unit 120, a temperature of the lower surface of the quartz rod 124 up to a predetermined target temperature, and then injecting a gas into a pressurized gas injection port (not illustrated). With this blow molding, the molding material S has a shape corresponding to a shape of a molded product.

The blow molding devices, which are disclosed in common in Documents 1 and 2, have the configurations and the operations suitable to rapidly heat, perform the blow molding on, and rapidly cool a material such as a panel made of an amorphous alloy. However, the blow molding device is not suitable to continuously perform the blow molding on several molding materials because the heating unit for heating the material to be subjected to the blow molding and the molding unit in which a vacuum is formed and the blow molding is performed are integrally fixedly coupled to each other.

That is, in the blow molding devices disclosed in Documents 1 and 2, the support unit 140 needs to be opened to place the molding material S on the molding unit 160, the support unit 140 needs to be closed to perform the blow molding, and the support unit 140 needs to be opened again to eject a molded product from the molding unit 160 after the blow molding is completed. As a result, there is a problem in that the subsequent blow molding of the molding material cannot be performed while the support unit 140 is opened or closed, and a considerably large amount of time is required to open or close the support unit 140.

DISCLOSURE

Technical Problem

The present invention provides a blow molding device, as disclosed in Documents 1 and 2, which heats a molding material, presses one side surface of the heated molding material with a gas, and attracts the other side surface of the heated molding material, in which the blow molding device may continuously perform the blow molding on the molding materials.

Specifically, the present invention provides a blow molding device which may continuously perform blow molding on molding materials by means of simple processes of performing the blow molding on one molding material, ejecting a molded product, and then placing a next molding material without opening or closing a unit for providing a sealed space in which blow molding is to be performed on a molding material.

Technical Solution

The above-mentioned problems to be solved by the present invention are solved by a blow molding device according to the present invention, the blow molding device including: a heating unit which is configured to heat a molding material; and molds between which the molding material is loaded and molded, in which the heating unit includes: an infrared lamp configured to emit infrared rays, a reflective mirror configured to concentrate the infrared rays emitted from the infrared lamp, and a light transmitting body configured to transmit the infrared rays concentrated by the reflective mirror to the molding material, and in which the molds mold the molding material by using gas pressures applied to surfaces of the molding material heated to a predetermined temperature by the infrared rays transmitted from the light transmitting body.

In the blow molding device according to the present invention, the molds include a first chamber and a second chamber which accommodate the molding material therebetween and define spaces in which the pressures required for the blow molding of the molding material are formed, in which the first chamber is fixedly coupled to the heating unit, a window for transmitting the infrared rays from the light transmitting body of the heating unit to the molding material is provided at one side of the first chamber, a sealing surface, which comes into contact with the molding material, is formed at the other side of the first chamber, a first space is formed between the sealing surface and the window, and the first space has an inlet port through which a gas having a pressure required for the blow molding of the molding material is introduced, and a discharge port through which air is disposed from the first space, in which the second chamber has a loading surface on which the molding material is loaded, the second chamber is closed as the molding material is placed on the loading surface, the second chamber has a second space having a shape corresponding to a shape into which the molding material is to be molded, and the second space has a discharge port through which air is discharged, in which the first chamber and the second chamber are moved between a first position at which the first chamber and the second chamber are moved to be close to each other such that the molding material is accommodated between the sealing surface and the loading surface and a second position at which the first chamber and the second chamber are moved to be spaced apart from each other such that the molding material is loaded on the second chamber or the molded molding material is separated from the second chamber, and in which at the first position of the first chamber and the second chamber, the molding material is heated to the predetermined temperature by the heating unit, the gas having the pressure required for the blow molding is introduced from the inlet port of the first chamber, and air is discharged from the discharge port of the second chamber, such that the molding material is molded in the second space of the second chamber.

In the blow molding device having the above-mentioned configuration, first, the molding material to be subjected to the blow molding is loaded on the loading surface of the second chamber in the state in which the first chamber and the second chamber are separated from each other, the second chamber or the first chamber is moved to be close to each other so that the loading surface of the second chamber faces the sealing surface of the first chamber, such that the molding material loaded on the loading surface of the second chamber is placed between the sealing surface of the first chamber and the loading surface of the second chamber. In this state, one side surface of the molding material faces the first space, the other side surface of the molding material faces the second space, and the molding material is heated by the heating unit.

When the molding material is heated to a temperature suitable for the blow molding, the gas is discharged from the second space of the second chamber, and the pressurized gas is introduced into the first space of the first chamber. In this case, the first and second spaces are in contact with each other and the surfaces of the molding material are in contact with the first and second spaces to maintain a sealed state, such that the pressing force is applied to the molding material from the first space and the negative pressure is applied to the molding material from the second space, such that the molding material is deformed to have a shape corresponding to the shape of the second space. The blow molding is completed as the molding material is cooled by coming into contact with the second chamber.

After the blow molding is completed, the first chamber and the second chamber are moved to be spaced apart from each other, and a molded product is ejected from the second chamber.

With these configuration and operation, the multiple second chambers may be prepared, the blow molding process may be performed in the state in which any one second chamber is disposed close to the first chamber and the heating unit, and a process of ejecting a molded product from another second chamber or a process of loading a molding material to be molded on another second chamber may be performed, such that the blow molding process may be continuously performed on the molding materials.

In addition, the second chamber is moved to be spaced apart from the first chamber when the molding material is loaded on the second chamber or a molded product is ejected, such that the first chamber or the heating unit does not act as an obstacle that hinders the process of loading or ejecting the molding material, and as a result, the loading or ejecting process may be automated and quickly performed.

As an additional feature of the present invention, at the second position of the first chamber and the second chamber, the gas may be discharged from the second space of the second chamber through the discharge port to apply the negative pressure to the molding material loaded on the loading surface.

With this configuration, attractive force is applied to the molding material from the second space when the second chamber is moved in the state in which the molding material is loaded on the loading surface, and as a result, the alignment of the molding material with the second chamber is maintained and a deviation of the molding material is prevented.

Meanwhile, in the present invention, the second chamber may be configured to be movable upward and downward, by a lifting device, relative to the first chamber and the heating unit and may be configured to be movable laterally from the first chamber and the heating unit by a turntable or a linear motion device. On the contrary, the first chamber and the heating unit may be configured to be movable upward and downward, by a lifting device, relative to the second chamber and may be configured to be movable laterally from the second chamber by a turntable or a linear motion device.

DESCRIPTION OF DRAWINGS

FIG. 1 is a longitudinal sectional view of a blow molding device according to an invention disclosed in Document 1.

FIG. 2 is a longitudinal sectional view of a blow molding device according to a first exemplary embodiment of the present invention.

FIGS. 3 to 6 are longitudinal sectional views illustrating operations of upper and lower chambers of the blow molding device according to the first exemplary embodiment of the present invention.

FIG. 7 is a longitudinal sectional view of a blow molding device according to a second exemplary embodiment of the present invention.

BEST MODE

Hereinafter, configurations and operations of blow molding devices according to exemplary embodiments of the present invention will be described.

In the following exemplary embodiments, a panel made of an amorphous alloy is described as an example of a molding material to be molded by the blow molding device according to the present invention. However, the blow molding device according to the present invention may be used to perform blow molding on various materials such as metal, resin, or glass without being limited to the amorphous alloy.

In addition, in the following exemplary embodiment, the blow molding of the panel will be described for convenience of illustration and description. However, the present invention is not limited to the blow molding of the panel, and the present invention may be applied to a blow molding device that performs the blow molding on various types of molding materials suitable for the blow molding.

First, a configuration and an operation of a blow molding device according to a first exemplary embodiment of the present invention will be described with reference to FIGS. 2 to 6.

The blow molding device according to the first exemplary embodiment includes molds 20 and 30 between which a panel 1 is placed and heated and blow molding is performed, and a heating unit 10 which serves as a heat source for heating the panel.

The heating unit 10 has substantially the same configuration as the heating units of the blow molding devices disclosed in Documents 1 and 2.

The heating unit 10 includes an infrared lamp 11 which generates and emits infrared rays by being supplied with electric power from a power source, a reflective mirror 12 which reflects and concentrates the infrared rays emitted from the infrared lamp 11, a quartz rod 13 which serves as a light transmitting body for transmitting the infrared rays, which are concentrated by the reflective mirror 12, to the mold 30, a housing 14 which accommodates therein the above-mentioned components, and a cooling line 15 which surrounds the housing.

The molds 20 and 30 include an upper chamber 20 which is coupled to the heating unit 10, and a lower chamber 30 which is operated vertically relative to the upper chamber 30 and on which the panel 1, a molding material, is placed.

Because the power source for supplying the electric power to the heating unit 10, a driving means for vertically operating the lower chamber 30, a means for supplying a cooling medium to the cooling line 15, means for supplying pressurized gas into the upper chamber 20 and a means for applying negative pressure to the lower chamber 30 by withdrawing the gas, and various types of valves, pumps, and control devices for controlling the above-mentioned components are publicly known elements, these components are not illustrated in the drawings and descriptions thereof will be omitted.

The infrared lamp 11 emits the infrared rays with a wavelength of 3 to 25 μm, and the infrared rays with the wavelength range are applied to the panel 1 to heat the panel 1 to a molding temperature.

The reflective mirror 12 is formed to surround the infrared lamp 11 so that the infrared lamp 11 is disposed inside the reflective mirror 12. An inner surface of the reflective mirror 12, which defines a reflective surface, is coated with a material such as a gold coating having high reflectivity in respect to the infrared rays. The inner surface has a cross-sectional profile that concentrates the infrared rays emitted from the infrared lamp 11 on an upper end surface of the quartz rod 13.

The housing 14 is made of a refractory material and mounted to surround an outer portion of the reflective mirror 12 to seal the reflective mirror 12. The cooling line 15 for preventing overheating is provided outside the housing 14.

A support pin 16, which supports the reflective mirror 12 on the housing, is provided between the housing 14 and the reflective mirror 12, and a lower end of the housing 14 and a lower end of the reflective mirror 12 are mounted on an upper end surface of the upper chamber 20 of the molds, such that the heating unit 10 and the upper chamber 20 of the molds are fixedly coupled to each other.

The quartz rod 13 is disposed to penetrate the upper chamber 20, and the upper end surface of the quartz rod 13 is placed at the lower end of the reflective mirror 12, such that the infrared rays, which are emitted from the infrared lamp 11 and then reflected by the reflective mirror 12, are concentrated on the upper end surface of the quartz rod 13.

The infrared rays, which are emitted from the infrared lamp 11 and then enter the upper end surface of the quartz rod 13, are reflected by an inner interface of the quartz rod 13 while passing through the interior of the quartz rod 13, and then exit through a lower end surface of the quartz rod 13, such that the panel 1 placed between the upper and lower chambers 20 and 30 of the molds is irradiated with the infrared rays.

An anti-reflection-treated layer 131 is provided on the lower end surface of the quartz rod 13, such that the infrared rays passing through the quartz rod 13 may be applied to the panel 1 without being reflected. However, the anti-reflection-treated layer 131 is not essential to the light transmitting body for the infrared rays, and the anti-reflection-treated layer 131 is just adopted as a component for improving efficiency of the quartz rod 13 in transmitting the infrared rays in the blow molding device according to the first exemplary embodiment.

The heating unit 10 is mounted as the housing 14 and the reflective mirror 12 of the heating unit 10 are coupled to an upper end surface 26 of the upper chamber 20 of the molds. A first space 21, which is concavely recessed inward from a flat lower end surface 25, is formed at a lower end of the upper chamber 20. The first space 21 is opened at the lower end surface 25, and the quartz rod 13 is inserted into the upper end surface 26 opposite to the first space 21, such that the upper chamber 20 defines a window on which the infrared rays are incident.

An upper end surface 35 of the lower chamber 30 of the molds faces the lower end surface 25 of the upper chamber 20, and a second space 31, which is opened at the upper end surface 35, is concavely recessed downward from the upper end surface 35.

The first space 21 of the upper chamber and the second space 31 of the lower chamber face each other, and the panel 1 is disposed between the first space 21 and the second space 31. The pressurized gas is introduced into the first space 21 and the gas is withdrawn from the second space 31 to apply the negative pressure, such that the panel 1 is fixed between the molds 20 and 30 or the blow molding is performed by the pressure of the gas.

The upper end surface 35 of the lower chamber is formed as a loading surface on which the panel 1 is loaded. A sealing element 34, which implement sealability against outside air, is provided at a position at which the panel 1 is placed. The lower end surface 25 of the upper chamber defines a sealing surface, which comes into close contact with the upper end surface of the lower chamber 30, when the upper chamber 20 and the lower chamber 30 come into contact with each other.

The upper chamber 20 has an inlet port 22 through which the gas is introduced into the first space 21, and a discharge port 23 through which the gas is discharged from the first space 21. A gas supply source, a gas inflow conduit, and a valve are connected to the inlet port 22 to supply the pressurized gas, such that the pressurized gas is supplied to the inlet port 22 with a pressure required for the blow molding. A valve, a reservoir, a vacuum pump and the like are connected to the discharge port 23 to discharge the gas from the first space.

Because the gas supply source, the gas inflow conduit, the valve, the reservoir, the vacuum pump, and the like are publicly known elements, these components are not illustrated in the drawings for convenience of illustration, and detailed descriptions thereof will be omitted.

The lower chamber 30 has a discharge port 33 through which the gas is discharged from the second space 31. Like the discharge port 23 of the upper chamber 20, the discharge port 33 is also connected to the vacuum pump, the reservoir, and the valve, such that the negative pressure may be applied to the second space 31 as the gas is discharged from the second space 31.

Next, an operation of performing the blow molding on one panel by the blow molding device according to the first exemplary embodiment, which is configured as described above, will be described with reference to FIGS. 3 to 6.

FIGS. 3 to 6 illustrate the molds 20 and 30 of the blow molding device according to the first exemplary embodiment and illustrate processes sequentially performed by the molds.

First, referring to FIG. 3, the lower chamber 30 is disposed below the upper chamber 20, and the panel 1 is loaded on the upper end surface 35, the loading surface, of the lower chamber 30.

In the state in which the panel 1 is loaded, the lower chamber 30 is moved upward in the direction of the arrow A toward the upper chamber 20, such that the panel 1 comes into contact with the lower end surface 25 of the upper chamber 20.

The gas is discharged from the second space 31 by gas suction from the vacuum pump (not illustrated) through the discharge port 33 of the lower chamber while the lower chamber 30 is moved upward, such that a negative pressure P1 is applied to the second space 31 because the opened side of the second space 31 of the lower chamber, which is adjacent to the upper end surface of the lower chamber, is covered by the panel 1 and sealed by the sealing element 34.

One surface of the panel 1, which faces the second space 31, is at a low pressure because of the negative pressure P1, and the other side surface of the panel 1 is opened to the atmosphere, such that the panel 1 is attached to the lower chamber 30 and maintained in position on the upper end surface of the lower chamber 30 by a difference in pressure between the two surfaces without being detached from the lower chamber 30 while the lower chamber 30 is moved upward or rotated.

FIG. 4 illustrates a state in which the lower chamber 30 is moved upward and the panel 1 is placed between the lower chamber 30 and the upper chamber 20.

In this state, the first and second spaces 21 and 31 are sealed to be isolated from outside air by the sealing elements 24 and 34 placed between the panel 1 and the lower end surface 25 of the upper chamber and between the panel 1 and the upper end surface 35 of the lower chamber. A pressure P2 close to a vacuum is applied to the first and second spaces 21 and 31 as the gas is discharged through the discharge port 23 of the upper chamber and the discharge port 33 of the lower chamber in the sealed state.

In this state, the heating unit 10 operates, the infrared lamp 11 emits the infrared rays, and the emitted infrared rays are concentrated on the upper end surface of the quartz rod 13 by the reflective mirror 12 and then pass through the quartz rod 13, such that the panel 1 disposed below the lower end surface of the quartz rod is irradiated with the infrared rays and heated. When the panel 1 is heated to a temperature suitable for the molding, the blow molding begins to be performed on the panel 1.

FIG. 5 illustrates a state in which the blow molding is performed after the panel 1 is heated.

The discharge port 23 of the upper chamber 30 is closed, the pressurized gas is introduced into the first space 21 from the inlet port 22 with a pressure P3 suitable for the blow molding, and at the same time, a negative pressure P4, which is suitable for the blow molding, is applied to the second space 31 from the discharge port 33 of the lower chamber 20.

Therefore, a force, which presses the panel 1 toward the second space 31, is applied to the panel 1 by the negative pressure P4 applied to the surface of the panel 1 adjacent to the second space 31 and the pressure P3 applied to the surface of the panel 1 adjacent to the first space 21, and as a result, the panel 1 is deformed to have a shape corresponding to a shape of the second space 31.

In the state in which the panel 1 is deformed, the portion of the panel 1, which is heated by the infrared rays, is rapidly cooled by coming into contact with the surface of the lower chamber 30.

In a case in which the panel 1 is made of an amorphous alloy, the panel 1 needs to be rapidly cooled to below a crystal temperature to prevent crystal formation after the panel is heated and molded. As necessary, a cooling line may be provided in a block that constitutes the lower chamber 30.

On the other hand, because excessive cooling of the molding material sometimes hinders the molding of the molding material, a heating line is provided in the block, which constitutes the lower chamber 30, to heat the lower chamber 30 to the extent that the molding material is not crystallized, such that it is possible to improve formability.

When the blow molding is completed, the lower chamber 30 is separated from the upper chamber 20. FIG. 6 illustrates a state in which the lower chamber 30 is separated from the upper chamber 20.

The negative pressure and the pressure, which are applied to the upper and lower chambers 20 and 30, are eliminated, and the lower chamber 30 is moved downward as indicated by the arrow B.

Although not illustrated in the drawings, the lower chamber 30 is mounted on a circular turntable or a linear motion device. When the lower chamber 30 is moved, as indicated by the arrow C, from a position below the upper chamber 20 by the turntable or the linear motion device, any obstacle, which may hinder an operation of moving upward the panel 1, which is molded by the blow molding, to separate the panel 1 from the lower chamber 30, is not disposed above the lower chamber 30, that is, the upper chamber 20 and the heating unit 10 are not disposed above the lower chamber 30.

In this state, the molded panel 1 is separated from the lower chamber 30, as indicated by the arrow D, by a pick-up device (not illustrated) or the like, and the process of the blow molding for one panel is ended.

Meanwhile, the lower chamber 30 is disposed separately from the heating unit 10 and the upper chamber 20 and moved vertically by a lifting device, such that the lower chamber 30 is coupled to or separated from the upper chamber 20. The lower chamber 30 is moved to other positions from the blow molding device according to the first exemplary embodiment by the turntable or the linear motion device.

Therefore, the multiple lower chambers 30 are prepared and disposed on the turntable that may be moved vertically and rotated, and the panels 1 are sequentially loaded on the multiple lower chambers 30, such that while the blow molding is performed on one panel, it is possible to perform a process of ejecting a completely molded panel from another lower chamber, a pre-molding process of applying a release agent onto or cleaning a portion of the lower chamber, which will come into contact with the panel, the molding material, when the blow molding is performed, that is, the loading surface 31 of the lower chamber 30, and a process of loading a panel to be molded. As a result, the blow molding may be continuously performed on the panels.

In addition, the processes of loading the panel on the lower chamber 30 and ejecting the panel from the lower chamber 30 are performed in the state in which the lower chamber is separated from the upper chamber and then moved to a lateral side of the upper chamber by the movement of the turntable or the linear motion device on which the lower chamber is disposed. As a result, instead of manual work, an automation process using the pick-up device may be performed.

Meanwhile, according to the configuration and the operation, in the state in which the blow molding of the panel is completed and the lower chamber is separated from the upper chamber and the heating unit, the molded panel remaining positioned on the lower chamber may be moved to a next process and then subjected to subsequent processing or treatment.

The blow molding device according to the first exemplary embodiment is configured such that the lower chamber 30 is moved upward and rotated or linearly moved. However, the same operational effect may be achieved even in a case in which the lower chamber on which the panel is loaded is fixed, and the heating unit 10 and the upper chamber 20 are moved relative to the lower chamber 30.

Meanwhile, although not illustrated in the drawings, the lower chamber 30 needs to be appropriately aligned with the upper chamber 20 because the lower chamber 30 performs various movements. The alignment may be performed by mounting a sensor on an upper chamber or a lower chamber, and controlling a driving means such as a solenoid, a hydraulic actuator, a servo motor, or the like based on a measurement signal from the sensor. Because the alignment may be performed by using a publicly known technology, a detailed description thereof will be omitted.

MODE FOR INVENTION

Next, a configuration and an operation of a blow molding device according to a second exemplary embodiment of the present invention will be described with reference to FIG. 7.

A heating unit 10' of the blow molding device according to the second exemplary embodiment differs from the heating unit according to the first exemplary embodiment. The heating unit 10' according to the second exemplary embodiment has the same configuration and the same operation as the heating unit illustrated in FIG. 7 in the blow molding device disclosed in Document 1.

An inner reflective surface of a reflective mirror 12' of the heating unit 10' has a parabolic cross-sectional profile, and the infrared rays emitted from an infrared lamp 11 are reflected by the reflective mirror 12' and uniformly enter a window 13' which is disposed below the reflective mirror 12' and made of quartz.

The heating unit 10' according to the second exemplary embodiment has a larger infrared ray emitting area than the heating unit 10 according to the first exemplary embodiment, such that the heating unit 10' is suitable for the blow molding to be performed on a panel having a relatively large area.

The lower chamber 30 of the molds according to the second exemplary embodiment have substantially the same configuration as the lower chamber according to the first exemplary embodiment. An upper chamber 20' according to the second exemplary embodiment differs from the upper chamber according to the first exemplary embodiment in that a gas inlet port 22' and a discharge port 23' are formed in lateral surfaces of the upper chamber 20' so that the upper chamber 20' accommodates the window 13' having a large area.

While the configurations and the operations of the exemplary embodiments of the present invention have been described above, the present invention is not limited to the exemplary embodiments, various alterations and modifications and addition of constituent elements are enabled within the scope defined by the appended claims, and all of these alterations and modifications and the addition of the constituent elements fall within the scope of the present invention.

The invention claimed is:

1. A blow molding device comprising:
a heating unit configured to heat a molding material; and
molds configured to load and mold the molding material therebetween,
wherein the heating unit includes,
an infrared lamp configured to emit infrared rays,
a reflective mirror configured to concentrate the infrared rays emitted from the infrared lamp, and
a light transmitting body configured to receive the infrared rays concentrated by the reflective mirror and transmit the concentrated infrared rays to the molding material,
wherein the molds are configured to mold the molding material by using a gas pressure applied to surfaces of the molding material that has been heated to a temperature by the infrared rays transmitted from the light transmitting body,
wherein the molds include a first chamber and a second chamber that accommodate the molding material therebetween and define spaces in which the gas pressure is formed,
wherein the first chamber is fixedly coupled to the heating unit, and the first chamber includes a window at one side of the first chamber and a sealing surface at the other side of the first chamber, the window configured to accommodate the light transmitting body of the heating unit therethrough, the sealing surface configured to come into contact with the molding material, the sealing surface and the window configured to form a first space therebetween, and the first space including an inlet port configured to introduce a gas having a pressure and a first discharge port configured to discharge air from the first space,
wherein the second chamber has a loading surface on which the molding material is loaded, the second chamber is configured to be closed as the molding material is placed on the loading surface, the second chamber has a second space having a shape corresponding to a shape into which the molding material is to be molded, and the second space has a second discharge port configured to discharge air therefrom, wherein the first chamber and the second chamber are configured to be moved between a first position, at which the first chamber and the second chamber are moved to be close to each other such that the molding material is accommodated between the sealing surface and the loading surface, and a second position, at which the first chamber and the second chamber are moved to be spaced apart from each other such that the molding material is loaded on the second chamber or the molded molding material is separated from the second chamber, and wherein at the first position of the first chamber and the second chamber, the heating unit heats the molding material is heated to the temperature, the inlet port of the first chamber introduces the gas having the pressure into the first chamber, and the second discharge port of the second chamber discharges air from the second chamber, such that the molding material is molded in the second space of the second chamber.

2. The blow molding device of claim 1, wherein at the second position of the first chamber and the second chamber, the second discharge port is configured to discharge the gas from the second space of the second chamber to apply a negative pressure to the molding material loaded on the loading surface.

3. The blow molding device of claim 1, wherein at the second position of the first chamber and the second chamber, the gas is discharged from the first space of the first chamber and the second space of the second chamber and the heating unit is configured to heat the molding material in a state in which the molding material is placed between the sealing surface of the first chamber and the loading surface of the second chamber.

4. The blow molding device of claim 1, further comprising:

sealing elements on the sealing surface of the first chamber and the loading surface of the second chamber, the sealing elements configured to seal the first space and the second space by coming into contact with the molding material.

5. The blow molding device of claim 1, wherein
the second chamber is configured to be movable upward and downward, by a lifting device, relative to the first chamber and the heating unit, and
the second chamber is further configured to be movable laterally from the first chamber and the heating unit by a turntable or a linear motion device.

6. The blow molding device of claim 1, wherein
the first chamber and the heating unit are configured to be movable upward and downward, by a lifting device, relative to the second chamber, and
the first chamber and the heating unit are configured to be movable laterally from the second chamber by a turntable or a linear motion device.

7. The blow molding device of claim 1, wherein
the reflective mirror surround the infrared lamp under the infrared lamp, and
the light transmitting body being at a lower end of the reflective mirror and configured to transmit the infrared rays, which are received by the reflective mirror from the infrared lamp and are reflected and concentrated by the reflective mirror to the molds.

8. The blow molding device of claim 1, wherein the light transmitting body is a quartz rod.

9. The blow molding device of claim 8, further comprising:

an anti-reflection treated layer on a lower end surface of the quartz rod, the anti-reflection treated layer configured such that the infrared rays passing through the quartz rod is applied to the molding material without being reflected.

* * * * *